FIG. 2

INVENTORS: A.E.MELHOSE
W.W.TUTHILL
BY
J.W.Schmied
ATTORNEY

FIG. 3

INVENTORS: A. E. MELHOSE
W. W. TUTHILL
BY
J. W. Schmied
ATTORNEY

Patented Apr. 7, 1942

2,278,460

UNITED STATES PATENT OFFICE 2,278,460

CONTROL SYSTEM

Alfred E. Melhose, Westfield, N. J., and Walter W. Tuthill, Jackson Heights, N. Y., assignors to Bell Telephone Laboratories, Incorporated, New York, N. Y., a corporation of New York Application August 29, 1940, Serial No. 354,650

6 Claims. (Cl. 179—4)

This invention relates to communication systems and particularly to switching means in a system wherein a first type of transmission is interpolated in a second type of transmission during lulls and pauses in the said second type of transmission.

The object of the invention is to provide a circuit arrangement for performing switching functions to condition the transmission channel for one or another type of transmission with the utmost speed so as to prevent interference with such transmission. Heretofore so-called kick circuits or accelerating circuits have been provided for various purposes but such circuits have usually employed additional apparatus such as condensers, transformers and inductances. The present invention makes use of a novel circuit arrangement of relay windings and controlled circuits without the use of other apparatus in addition to that employed for the normal use of such relays. In addition, the present invention provides a particularly useful, economical and fast operating relay arrangement employing small and inexpensive relays.

In a preferred and specific embodiment of the invention herein disclosed by way of example, a so-called interpolated telegraph and telephone system is provided with a chain of relays known as the transmitting chain, whose duty it is to respond to voice currents and to condition the transmission channel for telephone transmission. This chain of relays must be fast acting and comparatively slow releasing, this latter characteristic being obtained through the use of hang-over circuits. The principal hang-over circuit is made to control all the relays in the chain beyond a given point and additional hang-over may be provided at other points along the chain. In the present disclosure there are provided seven relays in a chain, the first being known as the transmitting master and being responsible for the proper operation of the rest each of which has some specific duty to perform. The second relay in the chain is known as the transmitting voice hangover relay and its duty is to prevent the release of the remainder of the chain for a given time after the transmitting master has released. Another hang-over is provided, as will be apparent from the following description.

Since all relays of this chain must operate with the utmost speed the remainder of the relays are made dependent for their operation upon the movement of the armature of the master relay from its back contact, thus eliminating from their operating time even the travel time of the armature of the master. Since the next relay in the chain must remain operated for a given hang-over period after the release of the master its holding circuit, involving the hang-over circuit must be separate from the fast operating circuit for the remainder of the chain. Therefore the TVHO relay operates the rest of the chain in a similar manner, that is, by the breaking of a circuit at the back contact and armature of TVHO. Consequently, special means must be provided to make TVHO fast operating, and this means is embodied in an accelerating circuit involving separate windings on the TM (transmitting master) and TVHO relays. This accelerating circuit is rendered active as soon as the armature of TM leaves its back contact and remains active only until the armature of TVHO reaches its front contact. This circuit is also so arranged that it does not become active during the release of these relays, due to the fact that the armature of TM must reach its back contact again before the armature of TVHO leaves its front contact. During the time that the said accelerating circuit is active the cores of these two relays are subjected to a strong magnetizing circuit which will cause them to move their armatures speedily.

A feature of the invention is a chain of relays uniformly fast operating but slow releasing by different degrees, employing an accelerating circuit to gain the utmost speed in operating and to overcome the delay characteristics introduced by the provisions for slow release.

Another feature is an accelerating circuit for a chain of two relays, responsive to the movement of the armature of the first relay from its back contact for strongly energizing both said relays until the second of said relays has moved its armature to its front contact.

Another feature of the invention is an accelerating circuit for a chain of two relays effective only during the movement of the armatures of said relays from their back to their front contacts.

Still another feature of the invention is a drain of two relays, the first of which is free to respond without delay to energizing impulses and the second of which is delayed by a hang-over circuit in its release and which relays control a self-energizing circuit only during the forward movement of their armatures.

This invention is an improvement in the system disclosed in Patent 2,207,720, granted to Cole et al., July 16, 1940.

The drawings consist of four sheets of circuit diagrams. With Figs. 1, 2 and 3 placed together a circuit diagram of one terminal of an interpolated telephone and telegraph system is shown.

Fig. 3 shows the receiving telegraph circuits;

One terminal of a system is shown but it will be understood that at some distant point a similar terminal is located so that speech coming in over channel 201 will be transmitted from the radio transmitter 202 and its antenna 203 to be received at the said distant point over the antenna 204 and the radio receiver 205 for transmission into the speech path at that point corresponding to the channel 201.

Figure 1:
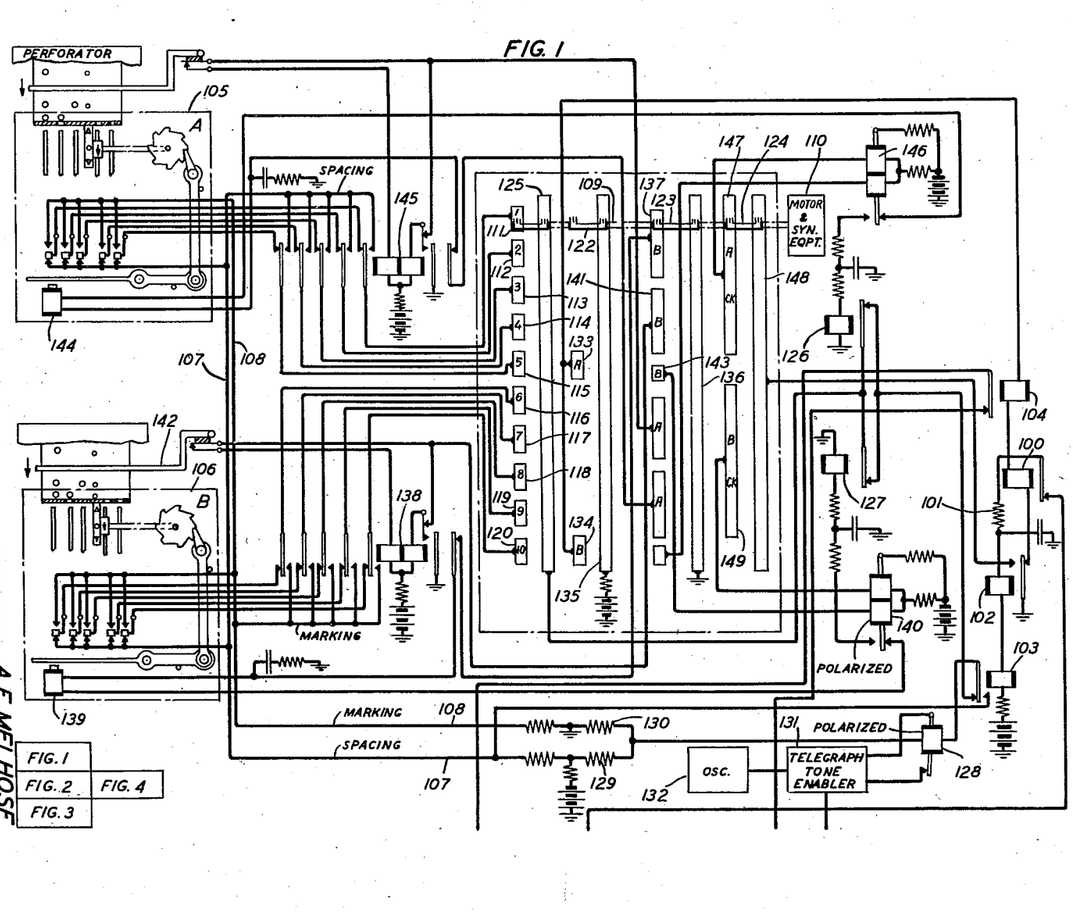
Fig. 1 shows the transmitting telegraph circuits.
Figure 2:
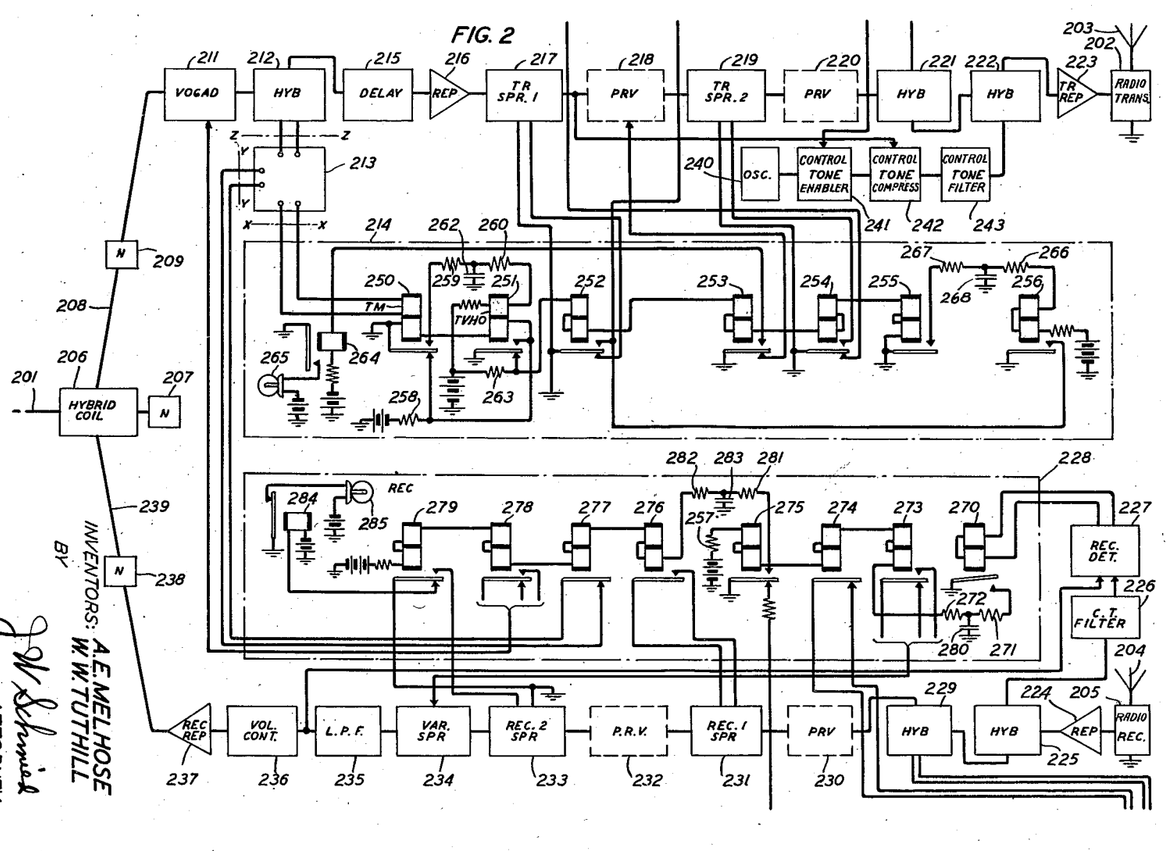
Fig. 2, partly schematic and partly circuit diagram, shows the telephone and controlling circuits.

While speech is being transmitted from channel 201 over the antenna 203, the telegraph transmitting apparatus of Fig. 1 is inactive and the telegraph receiving apparatus of Fig. 3 at the distant point is similarly inactive. By the same token, the telegraph transmitting apparatus of Fig. 1 at the distant point and the telegraph receiving apparatus of Fig. 3 at the near end, as shown, will be in operation.

In general, speech over channel 201 enters the hybrid coil 206 provided with the usual balancing network 207, passes over path 208 through the network 209 to the voice operated gain adjusting device (termed vogad for short) 211. From the vogad 211 speech currents enter the hybrid coil 212 where they split, part going on to the main speech channel and part entering the syllabic amplifier-detector 213 for control purposes. The output of the amplifier-detector 213 operates the transmitting relay chain 214 which performs a variety of switching functions, as will be more clearly set forth hereinafter. At present it is sufficient to say that the transmitting chain 214 clears the way for the speech currents to the antenna 213 and that the distant receiving terminal similarly conditions the receiving circuits thereat for the proper reception of the speech currents. The main portion of the speech currents then pass from the hybrid coil 212 into the delay circuit 215, through a repeater 216, and the first transmitting suppressor 217. Thereafter the speech path is through privacy circuit 218, the second transmitting suppressor 219, and another part of the privacy circuit 220 to the hybrid coil 221. Speech currents then pass to the hybrid coil 222, thence to the transmitting repeater 223 to the radio transmitter 202.

At the distant receiving end the speech currents transmitted from the radio receiver pass through the receiving repeater 224 into the hybrid coil 225. At this point the control tone which accompanies speech is diverted to the control tone filter 226, to the receiving detector 227, which operates the receiving relay chain 228. This receiving chain responds to the control tone transmitted from the distant end through the operation of the transmitting chain 214 thereat and, like the transmitting chain, performs a variety of switching functions which will be more fully described hereinafter. At present it is sufficient to say that the receiving chain clears the way for the speech currents to reach the hybrid coil 206 and channel 201. The speech currents leaving the hybrid coil 225 enter the next hybrid coil 229 and thence pass through a part of the privacy circuit 230, the first receiving suppressor 231, another part of the privacy circuit 232 to the second receiving suppressor 233. From this point the speech currents pass through the variable suppressor 234, a low-pass filter 235, a volume controller 236, a repeater 237, a network 238, and thence to the hybrid coil 206 from which they pass over the channel such as 201 at the said distant terminal.

The functions of these various pieces of apparatus are briefly as follows.

Referring to the details of the speech control circuits, the hybrid coil 206 receives voice currents from the channel 201 and transmits them out over the channel 208. The hybrid coil 206 also receives voice currents from channel 239 and transmits them out over channel 201. Actually, the voice currents split equally to paths 208 and 239 but are prevented from passing over 239 beyond the repeater 237 by the unidirectional characteristics of this repeater. The function of the balancing network 207 is well known. In this connection it should also be noted that each of the hybrid coils 212, 221, 222, 225 and 229 are provided with appropriate balancing networks. The networks 209 and 238 are provided to perform certain functions necessary in commercial telephone circuits to compensate for the differences in transmission when the channel 201 is connected to different types of telephone circuits. They play no particular part in the present invention as their adjusting circuits are not shown but they are included in the schematic part of this diagram in order to render the diagram as complete as possible. The vogad 211 is a means for adjusting the gain applied to the voice currents incoming thereto so as to provide a uniform level at the point of its output. The coil 212 allows a small part of the voice currents to be taken off to the syllabic amplifier-detector 213. The delay circuit 215 is an arrangement by which voice currents are delayed to allow time for the transmitting chain 214 to properly perform its functions before the voice currents are finally delivered to the antenna 203. Since these delay circuits entail certain loss in transmission, amplifying means are associated therewith in the form of a repeater 216 which is shown as a one-way amplifying repeater. The first transmitting suppressor 217 and the second transmitting suppressor 219 both act to block speech currents therethrough when the relays of the transmitting chain 214 are in the position shown. When, however, the transmitting chain is operated both transmitting suppressor 217 and transmitting suppressor 219 give a clear path for the transmission of voice currents. The two privacy system units 218 and 220 are included to render the speech modulated waves between the antenna 203 and the distant antenna 204 unintelligible to simple detection receivers but do not form any essential part of the present invention, being included for the purpose of rendering the schematic layout as complete as possible. The function of the hybrid coil 221 is to transmit to the hybrid coil 222 either speech coming from the privacy system unit 220 or telegraph signals coming from Fig. 1, above. The function of the hybrid coil 222 is to pass on to the transmitting repeater 223 both the output of the hybrid coil 221 and the control tone originating from the oscillator 240. This oscillator is a source of alternating current of a frequency just outside the used voice range so that it may be effectually filtered out at the receiving end without disturbing the voice currents entering the receiving circuit thereat.

Current from the oscillator 240 enters the control tone enabler 241, which is under control of the transmitting chain 214, as will appear hereinafter. When the voice takes command of the transmitting chain 214 and certain relays in the telegraph transmitting apparatus of Fig. 1 are properly operated, the control tone enabler 241 will allow alternating current from the source 240 to enter the control tone compressor 242 and from this point the control tone will be passed through the filter 243 to the hybrid coil 222. The effect, therefore, is that when the voice takes command of the transmitting chain 214, control tone at full volume will be delivered to the hybrid coil 222. A short time thereafter, as measured by the delay circuit 215 and controlled by a connection in the voice path between the first transmitting suppressor 217 and the first unit of the privacy system 218, the control tone compressor will operate to regulate the volume of the control tone being delivered to the hybrid coil 222.

The transmitting repeater 223 is a well-known type of one-way amplifier. The radio transmitter 202 and its associated antenna 203 need no special description. Likewise, the radio receiver 205 and its associated antenna 204 need no special description. The repeater 224 is, like the repeaters 216 and 223, a one-way amplifying device.

The hybrid coil 225 receives the output of the radio receiver 205 and allows part of this output to flow to the control tone filter 226 which delivers to the receiving detector 227 only the control tone. The hybrid coil 225 also delivers to the next hybrid coil 229 the speech currents, the accompanying control tone being filtered out later. Hybrid coil 229 acts to deliver the speech currents which are transmitted from the radio receiver 205 to the privacy system unit 230 and the various circuit units thereafter. During intervals of telegraph transmission the hybrid coil 229 delivers the output of the radio receiver 205 to the telegraph receiving apparatus of Fig. 3.

The privacy system units 230 and 232 used to insure a degree of secrecy are used in complement with units 220 and 218 in the transmission of intelligence by translating for delivery to channel 201 the otherwise unintelligible transmission from the antenna 203 to the antenna 204. The first receiving suppressor 231 and the second receiving suppressor 233, both under control of the receiving chain 228, operate to block the speech path during those intervals when the control tone is absent from the transmission being received by the receiver 205. When control tone is present as an indication that speech is present, the receiving chain 228 takes the position shown by the various relays and the receiving suppressors 231 and 233 give a clear path for speech currents toward the hybrid coil 206 and the channel 201. The variable suppressor 234 is a device used to cause the transition from speech to silence and from silence to speech to be slow so that static and other extraneous noises will not be applied to and removed from the speech circuit abruptly and so disturb the listener. The low-pass filter 235 effectually blocks any control tone which may have accompanied speech to this point and allows only the speech to go into the volume controller 236.

At this point it should be noted that between the low-pass filter 235 and the volume controller 236 there is a connection to the receiving detector 227. Thus when the voice takes command at the distant transmitting end, control tone from the oscillator 240 is transmitted by the radio transmitter at full volume, and this will enter the control tone filter 226 and the receiving detector 227 to insure the proper operation of the receiving master relay within the receiving chain 228. By the time that the voice arrives, the receiving chain will have conditioned the receiving circuit, particularly by operating the first and second receiving suppressors 231 and 233 and the variable suppressor 234. As the control tone is reduced in volume through the action of the control tone compressor 242 or through selective fading in the radio path, voice currents from the connection between the low-pass filter 235 and the volume controller 236 will reach the receiving detector 227 to augment the operation of this device and insure the proper and continuous operation of the receiving chain even during periods when fading or other disturbances in the mutable link cause the received control tone to drop to a value where the continued operation of the receiving chain might be unsatisfactory.

That part of the circuit between and including radio transmitter 202 and radio receiver 205 is spoken of as a mutable link since it comprises a signaling channel capable of or liable to change from internal or external cause which may give rise to interfering energy or, more specifically, subject to noise and fading or change of attenuation. It is to be understood, however, that the present showing is by way of example and that the term "mutable link" does not necessarily mean that a space radio link is invariably involved but that the term is broader in its meaning and includes any channel liable to change from internal or external cause.

The volume controller 236 is a device generally under the supervision of a technical operator for controlling the volume of speech delivered to 201 as indicated by a monitoring device, not shown, connected between this unit and the receiving repeater 237. The receiving repeater 237 is, like the other repeaters 216, 223 and 224, a one-way amplifying device.

The syllabic amplifier-detector 213 is a device which will be more fully described hereinafter. It is connected to the hybrid coil 212 through the broken line Z—Z and delivers its output through the broken line X—X to the transmitting chain 214. Through the broken line Y—Y it may be controlled from the receiving chain at the same terminal. If the receiving chain 228 is in the position shown, the amplifier-detector 213 will be enabled. If at this time voice currents come in over channel 201 their effect will be to operate the amplifier-detector 213 and thereupon operate the transmitting chain 214. This syllabic amplifier-detector 213 is a special type of amplifier-detector which will distinguish between voice currents and fortuitous disturbances so that the transmitting relay chain 214 will not be unnecessarily operated by such fortuitous disturbances. Further description of this amplifier-detector will be found hereinafter. At present it is only necessary to point out that voice currents coming into the hybrid coil 212 will cause the amplifier-detector 213 to operate the transmitting chain 214.

The transmitting chain comprises a transmitting master relay 250 and a chain of relays 251, 252, 253, 254, 255 and 256. The transmitting master relay 250 responds directly to the amplifier-detector 213. The relays 250 and 251 together provide an accelerating circuit for the sure and speedy operation of the remainder of the chain of relays. It will be noted that the lower windings of both relays 250 and 251 are included in a series circuit which extends from ground connected also to the armature of relay 250 through the lower windings of relays 250 and 251 and thence to a resistance 258 and battery. However, the connection between the lower winding of relay 251 and the resistance 258 extends to the back contact of relay 250 which, as before stated, is connected to ground. When relay 250 operates, then at the instant that the armature leaves its back contact the circuit from ground through the resistance 258 to battery is rendered effective and the lower windings on these relays are so designed that the current flowing in this circuit will cause the relays to attract their armatures strongly and with the utmost speed. When relay 251 moves its armature into connection with its front contact, the two lower windings of these relays are mutually connected in a closed circuit but the relay 250 will have moved its armature to its front contact and relay 251 will have become fully operated. Relay 251 is now held operated in a circuit from ground, the armature and front contact of relay 250, resistance 259, resistance 260, the upper winding of relay 251, resistance 261 to battery.

It should be noted that when under influence of the amplifier-detector 213 the transmitting master relay 250 becomes deenergized, the armature of relay 250 will reach its back contact and establish the original circuit for shunting the two lower windings of relays 250 and 251 before relay 251 can release its armature. Relay 251 is known as the transmitting voice hang-over relay and through the operation of the circuit including condenser 262 and resistance 260 this relay is caused to hold its armature operated until condenser 262 can become sufficiently charged. By the proper selection of the values of resistance 260 and condenser 262, the hang-over period by which the release of relay 251 is delayed beyond the release of relay 250, may be adjusted to any desired value.

Thus the accelerating circuit operates only on the forward operation of these relays 250 and 251 and plays no part in the release thereof.

The operation of relay 251 causes the operation of relays 252 to 256, inclusive. Relay 252 to 255, inclusive, have their windings in a series circuit extending to the back contact and armature of relay 251 and from this point extending also through resistance 263 to battery. Since the armature of relay 251 is grounded, the circuit through the windings of relays 252 to 255 normally is shunted. However, as soon as the relay 251 moves its armature from its back contact, the circuit through the resistance 263 will become effective and relays 252 to 255 will immediately become operated. Through the operation of relay 255, relay 256 is operated.

Relay 252 in its normal position affects the first transmitting suppressor 217 to block voice currents delivered to it by the repeater 216. Upon its operation, however, relay 252 changes this condition so that the first transmitting suppressor 217 now enables the free transmission of voice currents. Relay 253 is the privacy relay and this causes certain switching functions to take place when speech is to be transmitted out over antenna 203. The privacy relay 253 also functions on its front contact to operate the transmitting signal relay 264 and thus the signal lamp 265 to indicate that the transmitting chain is in operation. The relay 254 controls the second transmitting suppressor 219 and relay 255 functions to cause the operation of the transmitting telegraph enabler relay 256. This relay is provided with a hang-over circuit comprising the resistances 266 and 267 and the condenser 268 so that the transmitting telegraph enabler relay does not become released for a given period after the remainder of the transmitting chain has released.

It has been noted briefly hereinbefore that the receiving detector 227 is first operated by control tone through the filter 226 at comparatively high volume and later, after the receiving chain 228 has operated, is then controlled by both the control tone at lower volume through the filter 226 and by voice currents coming in over a connection between the low-pass filter 235 and the volume controller 236. The receiving detector normally holds the control master relay 270 operated and when the receiving detector responds to these incoming control tone and voice currents, it allows relay 270 to become deenergized. During the normal condition, then, relay 270 is operated and the chain of relays controlled thereby is in the position shown. Upon the release of relay 270 a circuit is completed from ground, the armature and back contact of master relay 270, resistance 271, resistance 272, the windings of relays 273, 274 and 275 in series, and resistance 257 to battery. Upon the operation of relay 275 a connection is established from ground, armature and front contact of relay 275, resistances 281 and 282 and thence through the windings of relays 276, 277, 278 and 279 in series to battery. Resistances 271 and 272 of the condenser 280 from a hang-over circuit so that it is not for a given period after the master relay 270 has again operated that relays 273 to 279, inclusive, may release their armatures. In addition, the resistances 281, 282 and the condenser 283 from a hang-over circuit for relays 276 to 279, inclusive, so that it is not for an additional period after relays 273 to 275 have released that relays 276 to 279 will release.

Relay 273, known as the receiving suppressor relay, in releasing changes the circuits of the variable suppressor 234 so as to allow what may be termed a gradual closing of the voice path. Thereafter, in a time interval as measured by the hang-over circuit of resistances 281 and 282, and condenser 283, the receiving suppressor relays 276 and 279 will cause the first and second receiving suppressors 231 and 233, respectively, to fully close the voice channel leading to the hybrid coil 206. It should be noted that the action in the opposite direction, that is when the master relay 270 releases and the relays of the chain operate, is to quickly remove the blocking action of suppressors 231 and 233 and then to gradually and fully open up the voice path through the operation of the variable suppressor 234. The telegrad relay 274 operates to control the telegrad of Fig. 3. Relay 275, known as the receiving printing master relay, controls the printer circuit in Fig. 3. The receiving echo hang-over relay 271 controls the amplifier-detector 213 at the same terminal and the vogad disabler relay 278 controls the vogad 211 so that while speech is being received at the transmitting terminal, the gain of the vogad 211 will remain unchanged. Relay 279 when released causes the operation of relay 284 and in turn the glowing of lamp 285, as a signal that the receiving chain is effectively operated.

Figure 4:
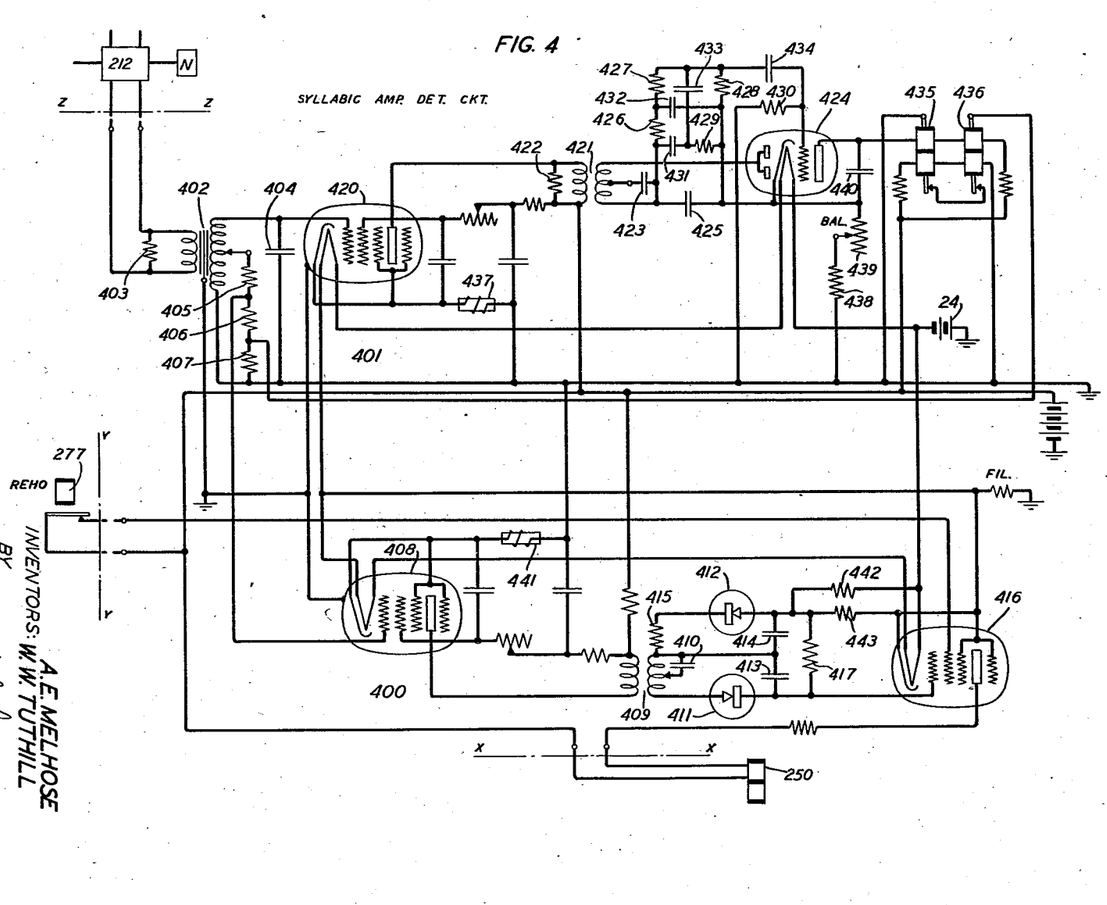
Fig. 4 is a detailed circuit diagram of a syllabic amplifier-detector circuit indicated by the rectangle 213 in Fig. 2 and intended to be fitted into the general diagram of Fig. 2 at the broken lines X—X, Y—Y and Z—Z.

The transmitting amplifier-detector 213 shown in full in Fig. 4 is designed to be unoperated by the maximum noise which may be expected on the transmitting circuit but to be operated quickly by speed signals of both high and low amplitudes. Features of this amplifier-detector to be described below provide added discrimination between speech and line noise, and the reduction in false operation afforded by this protection enables improved operation to be attained for the case in which noisy telephone lines are connected to the terminal.

The amplifier-detector 213 comprises a voltage amplifier-detector 400 for controlling the operation of the transmitting chain 214 and a syllabic type amplifier-detector 401, operating as an enabler for the voltage amplifier-detector 400, the two amplifier-detectors 400 and 401 being coupled to the common input circuit from the hybrid coil 212 through an input transformer 402, the primary winding of which is shunted by the terminating resistance 403 and the secondary winding of which is shunted by a condenser 404. A portion of the secondary winding of input transformer 402 is shunted by a resistance comprising the three sections 405, 406 and 407 arranged as a voltage divider.

The voltage-operated amplifier-detector 400 comprises one stage of alternating current amplification consisting of a single pentode vacuum tube 408 having its cathode connected to the lower terminal of the secondary winding of input transformer 402 and the lower terminal of the voltage divider comprising resistances 405, 406 and 407, and its control grid connected to the tap of the voltage divider between the resistances 405 and 406. An interstage transformer 409 is provided with a primary winding connected in the plate-cathode circuit of tube 408 and a secondary winding tuned to 1300 cycles by the condenser 410. A rectifier consisting of copper-oxide rectifier units 411 and 412 and condensers 413 and 414 has its input connected to the secondary of transformer 409 and resistance 413. A stage of direct current amplification consisting of a single pentode vacuum tube 416 is provided with its control grid-cathode circuit connected to the output of the rectifier across shunt resistance 417. The master transmitting relay 250 which controls the operation of the transmitting chain of switching relays 251 to 256, inclusive, has its operating winding connected in the plate-cathode circuit of the amplifying tube 416.

The syllabic amplifier-detector 401 comprises a stage of alternating current amplification consisting of the single pentode amplifying vacuum tube 420 having its control grid-cathode circuit connected to the terminals of the secondary winding of input transformer 402. An interstage transformer 421 is provided with a primary winding shunted by resistance 422 connected in the plate-cathode circuit of tube 420 and a secondary winding which is tuned to 1800 cycles by the shunt condenser 423. A rectifier is provided by the diode portion of the diode-triode vacuum tube 424 connected to the secondary winding of transformer 421 through series condenser 425. A band-pass filter for passing frequencies between 1 and 15 cycles consists of resistances 426 to 430, inclusive, and condensers 431 to 434, inclusive, in the output of the diode-detector portion of the tube 420. A direct current amplifier consisting of the three-electrode amplifying portion of the tube 424 has its control grid-cathode circuit connected to the output of this filter. Relays 435 and 436 have their operating windings connected in series in the plate-cathode circuit of the amplifier portion of tube 424.

The various plate, screen and grid filters and bias circuits shown are necessary for the successful operation of the amplifier-detectors 400 and 401. Tube 420 obtains its grid bias by cathode voltage drop through the retardation coil 437 which also provides series feedback. The tube 424 obtains its grid bias by cathode voltage drop through the resistances 438 and 439. The condenser 440 operates as the plate filter for tube 424. The tube 408 obtains its grid bias by cathode voltage drop through the retardation coil 441 which also provides series feedback and the associated condenser and resistance provide the screen filter for the same tube. The tube 416 obtains its grid bias from the filament battery by means of the voltage divider consisting of resistances 442 and 443.

In the unoperated condition of relays 435 and 436, that is, with no speech waves being applied to the input of amplifier-detector 213 through input transformer 402, the lower resistance portion of the voltage divider comprising resistances 405 to 407 is short-circuited through the normally closed contacts of these relays in series, so that the voltage input to the amplifying tube 408 is decreased by about 10 decibels. This reduction in sensitivity is sufficient to prevent false operation of the voltage amplifier-detector 400 in response to any normal amount of line noise from the transmitting circuit which may be impressed on its input through the input transformer 402. The line noise will be prevented from causing false operation of the syllabic amplifier-detector 401 by the band-pass filter connected between the secondary of transformer 421 and the tube 424 which will transmit only the syllabic frequencies of speech and will not transmit the relatively steady noise.

Now let it be assumed that speech signals from a subscriber connected to channel 201 are being transmitted out toward the antenna 203. A portion of the speech signals will be diverted into the device of Fig. 4 and will be impressed, along with the noise waves received, on the input of the transmitting amplifier-detector through input transformer 402 and will be divided between the syllabic amplifier-detector 401 and the voltage amplifier-detector 400.

The portion of the speech signals and noise entering the syllabic amplifier-detector 401 will pass through the interstage transformer 421, which being tuned to 1800 cycles, will pass most of the higher voice frequencies (1500 to 3000 cycles). It has been found that for consonants in speech a better signal-to-noise ratio is obtained in the region of 1800 cycles and that words beginning or ending in consonants are the most susceptible to clipping. The tuning of the syllabic amplifier-detector 401 to 1800 cycles, as described, effectively makes this amplifier-detector a consonant-operated enabler device and provides improved operation of the transmitting chain 214.

The wave passed by the tuned transformer 421 are transmitted through the series condenser 425 to the diode-detector portion of the tube 424 which operates to demodulate the speech frequencies and to produce all the low frequencies caused by the syllabic nature of the speech, these products appearing across condenser 425. Those of the demodulated products which are between 1 and 15 cycles pass through the band-pass filter and are then amplified by the amplifying triode portion of the tube 424.

The amplified waves in the plate-cathode circuit of the triode portion of the tube 424 pass through the operating windings of relays 435 and 436 in series. These relays are poled and biased differently so that the relay 436 operates at the beginning of a word or syllable and relay 435 operates at the end of a word or syllable if the speech amplitude is sufficient. The result of operation of either of these relays is to remove the short circuit from about resistance 407, thereby increasing the voltage input to the amplifying tube 408 in the voltage amplifier-detector 400 by about 10 decibels and thus effectively increasing its sensitivity by that amount.

The speech and line noise impressed on the input of the amplifying tube 408 are amplified thereby and passed through the interstage transformer 409. This transformer being tuned to 1300 cycles, will be particularly effective in transmitting the lower speech frequencies (800 to 1500 cycles) and in this frequency range a better signal-to-noise ratio is obtained for the vowels in speech. The tuning of the circuit in this manner therefore makes the voltage amplifier-detector 400 effectively a vowel-operated device.

The waves passed by interstage transformer 409 are rectified in the rectifier connected between the secondary of transformer 409 and the tube 416 and the rectified voltages are applied across resistance 417 to the control grid-cathode circuit of the direct current amplifying tube 416 which is normally biased by the biasing circuit shown, to approximately cut-off. This normal bias is overcome by the opposing rectified voltage causing space current to flow in the anode-cathode circuit of the tube 416 to operatively energize the winding of the master relay 250 in the transmitting chain 214.

The combination of the vowel-operated switching detector with the consonant-operated detector enabler described provides added discrimination between speech and line noise and thus improved operation of the transmitting chain 214, especially from the standard of reduction in signal clipping.

Relay 277 in the receiving chain operates to disable this syllabic amplifier-detector. When the chain is in its unoperated position, as shown, so that speech coming in over channel 201 may effectively operate the transmitting chain 214, the contacts of relay 277 are closed and thus a battery connection to the plate of tube 416 is completed. When, however, speech is coming in over the radio receiver 205 and the receiving chain 223 is operated, then the consequent operation of relay 277 opens the battery connection to the plate of tube 416 and the syllabic amplifier-detector is thus effectively disabled.

When the transmitting chain 214 is in its unoperated condition, as shown, then the telegraph transmitting apparatus of Fig. 1 is rendered effective. The control circuit comprises a conductor leading from the front contact of both the transmitting telegraph enabler relay 256 and the first transmitting suppressor relay 252. This conductor may be traced to the back contact of relay 100, thence through the armature of this relay, resistance 101 and the windings of relays 102 and 103 in series to battery. Thus with the transmitting chain 214 in the condition shown, relays 102 and 103 will be unoperated and the transmitting telegraph apparatus will be conditioned for operation. It should also be noted that at this time a connection may be traced from ground, the armature and back contact of relay 254, through the armature and back contact of relay 104 for controlling the control tone enabler 241. Thus when the transmitting chain 214 is operated relays 102 and 103 will become operated and render the telegraph transmitting apparatus ineffective and at the same time the circuit for controlling the control tone enabler 241 will be interrupted and control tone path will be effectively opened up for transmission of control tone from the oscillator 240 to the hybrid coil 222.

The transmitting telegraph apparatus consists, generally, of a pair of tape transmitters 105 and 106. Each of these transmitters has a series of five contacts operating between a spacing battery lead 107 and a marking battery lead 108 and affecting, in turn, the segments 111 to 120, inclusive, of the multiplex distributor. This latter piece of apparatus consists, in general, of a motor and synchronizing equipment 110 operating a shaft 109. This shaft has upon it a number of brushes 121, 122, 123 and 124. The brush 121 as it passes successively over the segments 111 to 120, inclusive, connects these segments to the ring 125 which is connected through either the armature and back contact of relay 126 or the armature and back contact of relay 127, thence through the back contact and armature of relay 103 and the winding of the telegraph transmitting line relay 128 to a point on a potentiometer consisting of the resistances 129 and 130 whereby the relay 128 will respond to either marking or spacing potential and thus operate its armature accordingly. When relay 128 is operated by a spacing signal it closes a circuit through its armature and contact to render the telegraph tone enabler 131 ineffective to transmit telegraph tone from the source 132 to the hybrid coil 221. When the relay 128 is operated by a marking signal it opens this circuit which affects the telegraph tone enabler 131 in such a way that alternating current from the source 132 freely passes to the hybrid coil 221 and thence out over the radio transmitter 202.

It should be noted that when the transmitting chain 214 is operated and, consequently, relay 103 is operated, that a connection is extended from spacing battery lead 107 through the front contact and armature of relay 103 to the winding of relay 128 to hold this relay spacing and, therefore, continuously to block the transmission of telegraph tone from the source 132 to the hybrid coil 221.

The function of brush 122 is as follows: If the transmitting chain operates at any time before brush 122 comes in contact with segment 133 or segment 134, then relays 102 and 103 will be properly operated and further transmission of telegraph signals interrupted and the stepping of the tape magnet prevented. If, however, the operation of the transmitting chain 214 occurs while brush 122 is on either of these segments 133 or 134, a connection will be extended from battery, ring 135 over brush 122 to segment 133 and thence through the windings of relays 104 and 100, the back contact and armature of relay 102 to ground. This causes the circuit for the operation of relays 102 and 103 to be opened to prevent the disabling of the telegraph apparatus for this very short interval. This arrangement is provided so that if the voice takes command of the circuit at or during the transmission of the last pulse of a telegraph code, this last pulse may be allowed to be transmitted without interruption.

The function of brush 123 is as follows: The segments and rings of this multiplex distributor are developed for the sake of clarity and the brush 123, now moving downwardly, has reached the point where transmission of the signals from the tape transmitter 106 has been completed. Brush 123 now establishes a connection from ground, ring 136, brush 123, segment 137, back contact and outer right-hand armature of relay 138, winding of stepping magnet 139, right-hand contact and armature of relay 140 to battery. If relay 140 is on its right-hand contact, as it should be while this apparatus is operating normally, and there is a sufficient supply of tape for use by the transmitter 106, then the magnet 139 will operate and advance the tape to the next punched character. As brush 123 advances it next comes into contact with segment 141 where a connection is established from ground, ring 136, brush 123, segment 141, the contacts of the taut tape switch 142, which will be closed as long as there is sufficient tape in this transmitter, to the left-hand winding of relay 138. This connection also extends in parallel through the normal contacts and the inner right-hand armature of relay 138 through the right-hand winding of this relay, and these windings being opposed no operation of the relay 138 will occur. If, however, upon the operation of magnet 139 the taut tape switch 142 had operated, then only the right-hand winding of relay 138 would have been energized and this relay would then have operated and locked through its inner right-hand armature to ground. This condition would have persisted until the taut tape switch 142 closed its contacts again and brush 123 made contact with segment 141 whereupon the relay 138 would have been automatically released.

During the time that relay 138 is operated each of the segments 116 to 120, inclusive, would have been connected through the front contacts and left-hand armatures of relay 138 to marking battery, so that a signal consisting of five marking pulses would have been repeatedly sent each time the brush 125 passed over the segments 116 to 120, inclusive.

When brush 123 advances to segment 143 a connection is momentarily established from ground, ring 136, brush 123, segment 143, the lower winding of relay 140 to battery. This tends to drive relay 140 to its right-hand contact where it will remain unless some other circuit is closed to change this condition.

As brush 123 advances further it first causes the operation of stepping magnet 144 in a similar manner to the operation of stepping magnet 139 and attempts to operate the relay 145 and finally closes a circuit to drive relay 146 to its right-hand armature.

The function of brush 124 is as follows: If during the time that brush 124 is on segment 147 relay 102 becomes operated then a circuit will be established from ground, the armature and front contact of relay 102, ring 148, brush 124, segment 147, the upper winding of relay 146 to battery. Relay 146 will thereupon be driven to its left-hand contact where it will remain until brush 123 drives it back to its left-hand contact. During the time that relay 146 is on its left-hand contact it will cause the operation of relay 126 in an obvious circuit and thereby initiate the opening of the transmitting circuit which operates the telegraph transmitting relay 128. When brush 124 reaches the lower segment 149 it will cause the relay 140 to move to its left-hand contact whereupon the relay 127 will be operated and complete the opening of the circuit for relay 128. It will be noted that each of these relays 146 and 140 will be periodically returned to its right-hand contact at the ending of the period of activity of the other circuit, but if the telegraph transmitting apparatus is now rendered ineffective the relay will return to its left-hand contact immediately thereafter and before any signals can be effectively transmitted.

It should be noted before leaving the description of the transmitting telegraph apparatus that if both the taut tape switches open the left-hand windings of relays 138 and 145, respectively, that the contacts and the left-hand armatures of relay 145 are connected to spacing battery so that first a series of five marking impulses and later a series of five spacing impulses will be transmitted. This provides for an occasional transition between a spacing and a marking impulse for the purpose of correcting the distributor speed at the distant end.

When the receiving chain is in the position shown then the telegrad relay 274 will close a contact on a pair of conductors leading into the telegrad 300. This will render the telegrad effective to operate the receiving telegraph apparatus. At this time telegraph signals being received by the radio receiver are passed into hybrid coil 229 and thence into the band-pass filter 301 from which they are delivered to the telegrad 300. This results in the operation of relays 302, 303 and 304 to their marking contacts for each marking impulse delivered to the telegrad 300. Relay 302 is known as the receiving telegraph line relay and for each marking impulse it establishes a ground connection to the ring 305. Relay 304 is known as the corrector relay. Upon each spacing impulse this relay will cause its condenser 306 to be energized and upon each marking impulse this relay will deliver the condenser discharge into ring 307. Relay 303 is known as the auxiliary relay and operates on each marking impulse to drive either relay 308 or relay 309 to its left-hand contact, respectively.

The receiving telegraph apparatus consists, generally, of two printers 310 and 311 and a multiplex distributor comprising a motor and certain synchronous equipment 312 operating a shaft 313 carrying brushes 314, 315, 316 and 317.

As brush 314 moves downwardly it connects the ring 305 through segments 318, 319, 320, 321 and 322 to the selecting magnets of printer 311 and thereafter through segments 323, 324, 325, 326 and 327 to the selecting magnets of printer 310. Thus for each marking impulse one of the selecting magnets of printer 311 or printer 310 is operated.

Brush 316 in moving downwardly makes contact with segments 328 and then 329 while brush 314 is traversing the connections to the selecting magnets of printer 311. The segments 328 and 329 are associated with printer 310. The connection to segment 328 establishes a circuit from ground, ring 330, brush 316, segment 328, armature and contact of relay 308 to the printing magnet 331. Thus the selection set upon printer 310 is rendered effective by the printing magnet 331 after the brush 314 has completely traversed the segments 323 to 327 and is now engaged in passing over the segments 318 to 322. As the brush 316 advances it makes a connection from ground to segment 329, which leads to the lower right-hand set of contacts of key 332, for purposes which will be hereinafter described.

As brush 316 next traverses segment 333 the printing magnet 334 will be operated.

Brush 317 makes contact from the ring 335 to the segment 336 during the time that the brush 314 is traversing the segments associated with the printer 311. This circuit from ring 335 extends a battery connection to the two windings of the relay 309 through the rectifiers 337 and 338. If this telegraph receiving apparatus is now properly in operative condition there will be an open connection to the upper winding of this relay at the armature and contact of relay 339. Any marking impulse coming in at this time will be rendered effective by the auxiliary relay 303 to keep relay 309 on its left-hand contact and thus render the printing magnet effective. If, on the other hand, the receiving chain 228 is operated by voice currents then relay 339 which will be released and ground on the armature of relay 339 will cause relay 309 to be driven to its other position where the circuit for printing magnet 334 is opened. Similar action of relay 308 will take place when the brush 317 traverses the segment 341.

It will also be noted that when the relay 339 is operated, as when the receiving chain 228 is in the position shown, thus denoting the fact that the receiving telegraph apparatus is effective, that relay 340 will be operated. Relay 340 plays a particular role with relation to the key 332.

If the distant transmitter corresponding to transmitter 106 operates its taut tape switch so as to send out a series of five marking impulses, then the receipt of these five marking impulses by the printer 310 results in a thumping of the teletypewriter apparatus without the production of any printing. If this becomes annoying to the operator then the key 332 may be moved to its right-hand position. Thereupon a circuit will be established from battery, the upper right-hand contacts of key 332, the winding of relay 342, the lower right-hand contacts of key 332 to the segment 329 and when brush 316 makes contact with segment 329 a connection is extended to ground on ring 330. This causes relay 342 to operate and this relay locks up and operates to battery on its inner right-hand armature. Relay 342 is sufficiently slow in releasing so that it will remain locked up in a manner now to be described. Upon the first operation of relay 342 a circuit for the operation of relay 343 is closed at the front contact and outer right-hand armature of relay 342. This relay now disconnects the segments 323 to 327, inclusive, from the selecting magnets of the printer 310 and extends them to conductor 344 which, with the left-hand contacts of key 332 in their normal position, extends the ground connection each time the brush 314 connects with a segment 323 to 327, inclusive, to the winding of relay 342 to maintain this relay operated.

If at the distant end the taut tape switch should return to normal then ground impulses will not be supplied to the winding of relay 342 at sufficient intervals to keep this relay operated and it will therefore release and by releasing cause relay 343 to return to normal, so that the printer 310 again becomes effective. If during the time that relay 342 is locked up the receiving telegraph apparatus is rendered ineffective by the operation of the receiving chain 228, then relay 340 returns to normal and this maintains relay 342 locked up until the telegraph apparatus is again rendered effective through the operation of the receiving chain 228.

Te relay 342 may be unlocked at any time by moving the key 332 to its left-hand position.

As brush 315 moves it alternatively makes contact with segments connected to either conductor 345 or 346. These conductors are connected to different windings of the corrector relay 347 and therefore the discharge of the condenser 306 will tend to operate the relay 347 in one direction if the motor 312 is running fast or operate the relay 347 in the other direction if the motor 312 is running slow. The correcting means is well known and will not be further described except to note that a device 348, which will indicate fast or slow operation, is inserted at this point to indicate that correction may be properly made.

What is claimed is:

1. In a communication system, a transmission channel, means for normally connecting a means for transmitting a first type of signals over said channel, means for alternatively connecting a means for transmitting a second type of signals over said channel, means responsive to said second type of signals, a chain of switching relays responsive to said last means for controlling said first and said second connecting means, said relays being arranged to respond rapidly and certain of said relays being arranged to release slowly, and an accelerating circuit for said relays, comprising an independent energizing circuit rendered effective only during the forward movement of the armatures of said relays.

2. In a communication system, a transmission channel, means for normally connecting a means for transmitting a first type of signals over said channel, means for alternatively connecting a means for transmitting a second type of signals over said channel, means responsive to said second type of signals, a chain of switching relays responsive to said last means for controlling said first and said second connecting means, said relays including a master relay arranged to respond freely to said means responsive to said second type of signals, and a hang-over relay arranged to release slowly, and an accelerating circuit for both said relays arranged to strongly energize both said relays during the interval after said master relay has started the movement of its armature until said hang-over relay has completed the movement of its armature.

3. In a communication system, a transmission channel, means for normally connecting a means for transmitting a first type of signals over said channel, means for alternatively connecting a means for transmitting a second type of signals over said channel, means responsive to said second type of signals, a chain of switching relays responsive to said last means for controlling said first and said second connecting means, said relays including a master relay arranged to respond freely to said means responsive to said second type of signals, and a hang-over relay arranged to release slowly, and an accelerating circuit for both said relays arranged to strongly energize both said relays during the interval after said master relay has started the movement of its armature until said hang-over relay has completed the movement of its armature, the remainder of said chain of relays being responsive to the starting of the movement of the said armature of said hang-over relay.

4. In a communication system, a transmission channel, means for normally connecting a means for transmitting a first type of signals over said channel, means for alternatively connecting a means for transmitting a second type of signals over said channel, means responsive to said second type of signals, a chain of switching relays responsive to said last means for controlling said first and said second connecting means, said relays including a master relay freely responsive to said means responsive to said second type of signals and a hang-over relay provided with a delay circuit for rendering said relay slow to release, an accelerating circuit including auxiliary windings on said master relay and said hang-over relay and means including the armatures and contacts of said relays for controlling said accelerating circuit.

5. In a communication system, a transmission channel, means for normally transmitting telegraph signals over said channel, means for alternatively transmitting voice currents over said channel, means comprising a syllabic amplifier-detector responsive to voice currents, a chain of switching relays responsive to said syllabic amplifier-detector for switching said channel between said telegraph and said telephone means, said chain of relays including a master relay freely responsive to said syllabic amplifier-detector, a hang-over relay freely responsive to said master relay in its operation but delayed in its release, and an additional plurality of switching relays freely responsive to said hang-over relay, an accelerating circuit for said master and said hang-over relays comprising a self-controlled strongly energizing circuit responsive to the movement of the armature of said master relay from its back contact, and means responsive to the movement of the armature of said hang-over relay from its back contact for controlling said additional plurality of switching relays.

6. In a communication system, a channel of transmission subject to two conditions, a master relay arranged to respond freely to one of said conditions, a hang-over relay controlled by said master relay and arranged to release slowly, and an accelerating circuit for both said relays arranged to strongly energize both said relays only during the interval after the master relay has started the movement of its armature until said hang-over has completed the movement of its armature.

ALFRED E. MELHOSE.
WALTER W. TUTHILL.